United States Patent
Gopinathapai et al.

(10) Patent No.: US 12,107,864 B2
(45) Date of Patent: Oct. 1, 2024

(54) SYSTEM AND METHOD FOR AUTOMATICALLY ASSIGNING NETWORK AND APPLICATION PERMISSIONS TO A NETWORK DEVICE BASED ON USER ATTRIBUTES

(71) Applicant: BANK OF AMERICA CORPORATION, Charlotte, NC (US)

(72) Inventors: Rajesh M. Gopinathapai, Aurora, IL (US); Satyajit Patki, Naperville, IL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 274 days.

(21) Appl. No.: 17/540,981

(22) Filed: Dec. 2, 2021

(65) Prior Publication Data
US 2023/0179603 A1 Jun. 8, 2023

(51) Int. Cl.
H04L 29/06 (2006.01)
H04L 9/40 (2022.01)

(52) U.S. Cl.
CPC .......... H04L 63/105 (2013.01); H04L 63/104 (2013.01)

(58) Field of Classification Search
CPC ...... H04L 63/104; H04L 63/105; H04L 63/08
See application file for complete search history.

(56) References Cited

U.S. PATENT DOCUMENTS

| | | | |
|---|---|---|---|
| 8,631,474 B2 | 1/2014 | Brown et al. | |
| 8,798,579 B2 | 8/2014 | Hickie | |
| 8,863,299 B2 | 10/2014 | Sharma et al. | |
| 9,241,011 B2 | 1/2016 | Tandon | |
| 9,454,665 B1 | 9/2016 | Wren et al. | |
| 9,465,953 B2 | 10/2016 | Sharma et al. | |
| 9,542,560 B2 | 1/2017 | Garcia et al. | |
| 9,641,553 B2 | 5/2017 | Ellis et al. | |
| 9,693,366 B2 | 6/2017 | Adjakple et al. | |
| 10,206,102 B2 | 2/2019 | Luft et al. | |
| 10,284,545 B2 | 5/2019 | Stephenson et al. | |
| 10,425,393 B2 | 9/2019 | Rong et al. | |
| 10,726,148 B2 | 7/2020 | Hughes et al. | |
| 10,785,050 B2 | 9/2020 | Ansari et al. | |
| 10,869,199 B2 | 12/2020 | Raleigh et al. | |
| 10,893,152 B2 | 1/2021 | Russell | |
| 2013/0029641 A1* | 1/2013 | Hickie | H04W 12/088 455/410 |
| 2016/0360414 A1 | 12/2016 | Beachem et al. | |
| 2017/0054821 A2 | 2/2017 | Rathod | |
| 2018/0052714 A1* | 2/2018 | Badjatia | H04M 15/66 |

(Continued)

*Primary Examiner* — Dao Q Ho (74) *Attorney, Agent, or Firm* — Moore & Van Allen PLLC; Lauren M. Stokes (57) ABSTRACT

Systems, methods, and computer program products are provided for automatically assigning resource permission levels. The method includes assigning a user to a user group based on one or more job characteristics. The user group includes one or more users associated with a common job type. The method also includes determining a resource permission level for one or more resources based on the user group of the user. Each of the users in a user group receive the same resource permission level for at least one of the one or more resources. The method further includes allowing the user access to one or more resources on a user device associated with the user.

18 Claims, 5 Drawing Sheets

(56) References Cited

U.S. PATENT DOCUMENTS

| | | |
|---|---|---|
| 2019/0188399 A1 | 6/2019 | Palaniappan et al. |
| 2019/0394206 A1* | 12/2019 | Zezza .................... H04L 67/01 |
| 2020/0236101 A1* | 7/2020 | Jones .................... G06F 16/951 |
| 2020/0358778 A1* | 11/2020 | Gopinathapai ....... G06F 21/604 |
| 2023/0179603 A1* | 6/2023 | Gopinathapai ....... H04L 63/104 |
| | | 726/4 |

\* cited by examiner

SYSTEM AND METHOD FOR AUTOMATICALLY ASSIGNING NETWORK AND APPLICATION PERMISSIONS TO A NETWORK DEVICE BASED ON USER ATTRIBUTES

TECHNOLOGICAL FIELD

An example embodiment relates generally to assigning resource permissions to a user, and more particularly, to automatically assigning resource permission levels based on job characteristics of a user.

BACKGROUND

Within a network, different users need different access levels to different resources, such as computer programs and applications. As such, it can be difficult to easily assign a new user the accurate access levels for a user across all resources on a network. However, it is paramount to network security and user efficiency for a user to receive the appropriate network permissions as soon as possible. There exists a need for a system that can quickly and accurately assign network permissions for one or more resources to a user.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for automatically assigning resource permission levels is provided. The system includes at least one non-transitory storage device and at least one processing device coupled to the at least one non-transitory storage device. The at least one processing device is configured to assign a user to a user group based on one or more job characteristics. The user group includes one or more users associated with a common job type. The at least one processing device is also configured to determine a resource permission level for one or more resources based on the user group of the user. Each of the users in a user group receive the same resource permission level for at least one of the one or more resources. The at least one processing device is further configured to allow the user access to one or more resources on a user device associated with the user.

In some embodiments, the common job type includes at least one of a common job title, a common supervisor, or a common practice group. In some embodiments, the user is assigned to a plurality of user groups with the user receiving at least one resource permission level for at least one resource based on each of the plurality of groups. In some embodiments, the at least one processing device is further configured to update the resource permission level of at least one of the one or more resources based on a change to at least one resource permission level of at least one of the users assigned to the user group.

In some embodiments, the at least one processing device is further configured to receive a resource permission level change input for at least one of the one or more users in the user group. In such an embodiment, the resource permission level is updated for the at least one of the users in the user group related to the resource permission level change input.

In some embodiments, the at least one processing device is further configured to update the resource permission level for at least one of the one or more resources for each of the one or more users in the user group based on the resource permission level change input for at least one of the one or more users in the user group.

In some embodiments, the at least one processing device is further configured to cause a transmission of a confirmation request to an administrator. In such an embodiment, the administrator approves or declines at least one of the user group or the one or more resource permission levels assigned to the user.

In another example embodiment, a computer program product for automatically assigning resource permission levels is provided. The computer program product includes at least one non-transitory computer-readable medium having computer-readable program code portions embodied therein. The computer-readable program code portions include an executable portion configured to assign a user to a user group based on one or more job characteristics. The user group comprises one or more users associated with a common job type. The computer-readable program code portions also include an executable portion configured to determine a resource permission level for one or more resources based on the user group of the user. Each of the users in a user group receive the same resource permission level for at least one of the one or more resources. The computer-readable program code portions further include an executable portion configured to allow the user access to one or more resources on a user device associated with the user.

In some embodiments, the common job type comprises at least one of a common job title, a common supervisor, or a common practice group. In some embodiments, the user is assigned to a plurality of user groups with the user receiving at least one resource permission level for at least one resource based on each of the plurality of groups. In some embodiments, the computer-readable program code portions further include an executable portion configured to update the resource permission level of at least one of the one or more resources based on a change to at least one resource permission level of at least one of the users assigned to the user group.

In some embodiments, the computer-readable program code portions further include an executable portion configured to receive a resource permission level change input for at least one of the one or more users in the user group. In such an embodiment, the resource permission level is updated for the at least one of the users in the user group related to the resource permission level change input. In some embodiments, the computer-readable program code portions further include an executable portion configured to update the resource permission level for at least one of the one or more resources for each of the one or more users in the user group based on the resource permission level change input for at least one of the one or more users in the user group.

In some embodiments, the computer-readable program code portions further include an executable portion configured to cause a transmission of a confirmation request to an administrator, wherein the administrator approves or declines at least one of the user group or the one or more resource permission levels assigned to the user.

In still another example embodiment, a computer-implemented method for automatically assigning resource permission levels. The method includes assigning a user to a user group based on one or more job characteristics. The user group includes one or more users associated with a common job type. Based on the user group of the user, the method also includes determining a resource permission level for one or more resources. Each of the users in a user group receive the same resource permission level for at least one of the one or more resources. The method further includes allowing the user access to one or more resources on a user device associated with the user.

In some embodiments, the common job type includes at least one of a common job title, a common supervisor, or a common practice group. In some embodiments, the user is assigned to a plurality of user groups with the user receiving at least one resource permission level for at least one resource based on each of the plurality of groups. In some embodiments, the method also includes receiving a resource permission level change input for at least one of the one or more users in the user group.

In some embodiments, the resource permission level is updated for the at least one of the users in the user group related to the resource permission level change input. In some embodiments, the method also includes updating the resource permission level for at least one of the one or more resources for each of the one or more users in the user group based on the resource permission level change input for at least one of the one or more users in the user group.

In some embodiments, the method also includes causing a transmission of a confirmation request to an administrator. In such an embodiment, the administrator approves or declines at least one of the user group or the one or more resource permission levels assigned to the user.

Embodiments of the present disclosure address the above needs and/or achieve other advantages by providing apparatuses (e.g., a system, computer program product and/or other devices) and methods for dynamically generating optimized data queries to improve hardware efficiency and utilization. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Having thus described embodiments of the disclosure in general terms, reference will now be made the accompanying drawings, wherein:

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

A network can have millions of unique resource permissions for resources across a network. As such, it is difficult to accurately set permissions for a new user to the network, such as a new employee to a company. Too many permissions for a new user may compromise the security of the system, while too few permissions for a new user can make it difficult for the new user to efficiently carry out the duties of their job and likely results in decreased efficiency due to the need for individual requests for access to a given resource. Therefore, there exists a need to automatically assign resource permission levels for resources to a user.

Various embodiments of the present disclosure allow for users to be assigned to user groups based on job characteristics, such as job title (or code), practice group, supervisors, and/or the like. Based on the assigned user group, the system can determine resource permission levels for one or more resources based on the resource permission levels of other users in the user group (e.g., a new salesperson would receive the same resource permission levels as other salespeople). Machine learning can be used to update and refine the assignment process, as well as the resource permission levels for users within the given user group. As such, the present disclosure allows for a user to be assigned resource permission levels automatically and efficiently.

Figure 1:
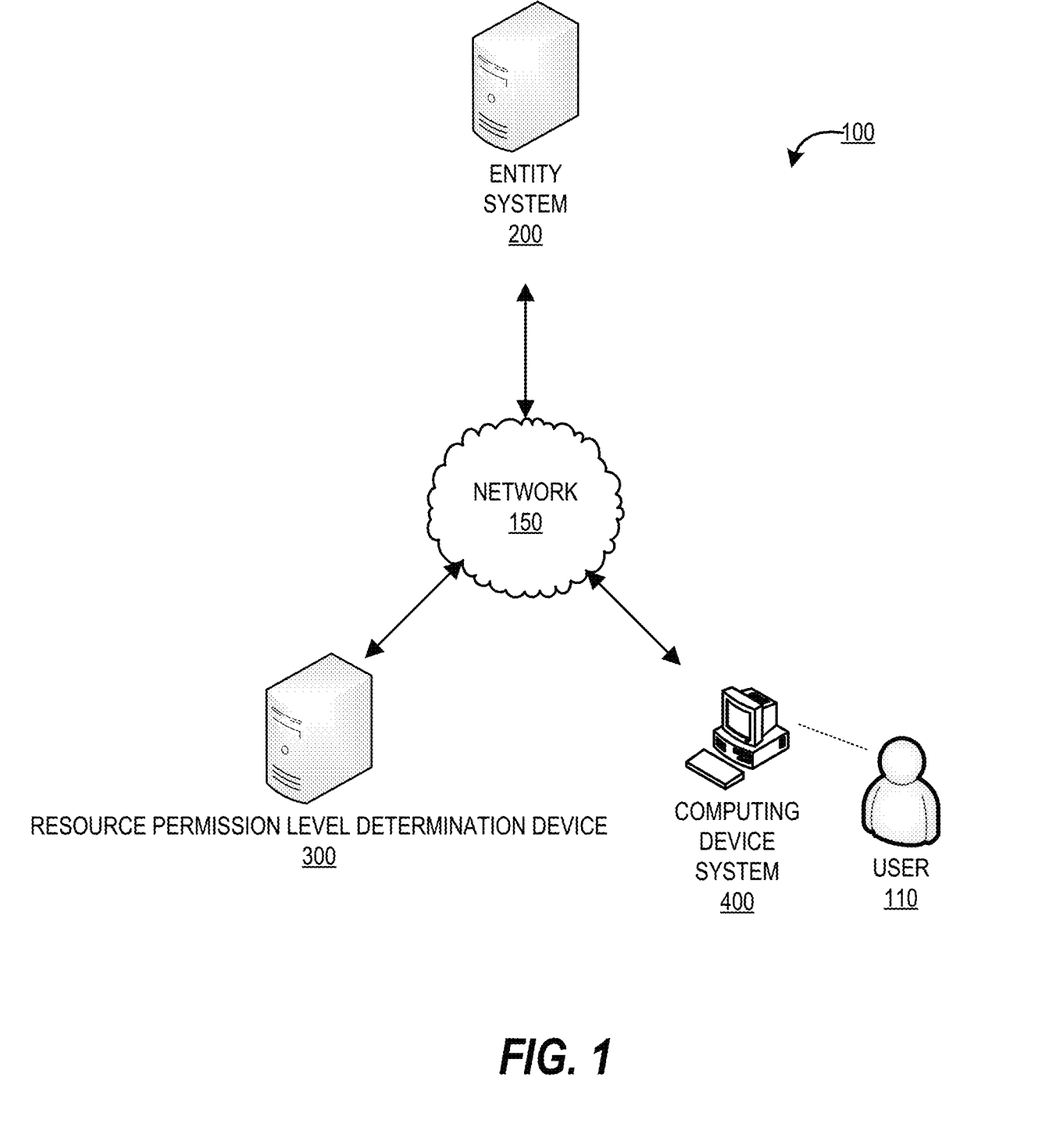
FIG. 1 provides a block diagram illustrating a system environment for automatically assigning resource permission levels, in accordance with embodiments of the present disclosure.

FIG. 1 provides a block diagram illustrating a system environment 100 for automatically assigning resource permission levels. As illustrated in FIG. 1, the environment 100 includes a resource permission level determination device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The resource permission level determination device 300 is a system of the present disclosure for performing one or more process steps described herein. In some embodiments, the resource permission level determination device 300 may be an independent system. In some embodiments, the resource permission level determination device 300 may be a part of the entity system 200. For example, the method of FIG. 5 may be carried out by the entity system 200, the resource permission level determination device 300, the computing device system 400, and/or a combination thereof.

The resource permission level determination device 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource permission level determination device 300 is configured to communicate information or instructions with the entity system 200, and/or the computing device system 400 across the network 150. While the entity system 200, the resource permission level determination device 300, and the computing device system 400 are illustrated as separate components communicating via network 150, one or more of the components discussed here may be carried out via the same system (e.g., a single system may include the entity system 200 and the resource permission level determination device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the resource permission level determination device 300, and/or entity system 200 across the network 150.

Figure 2:
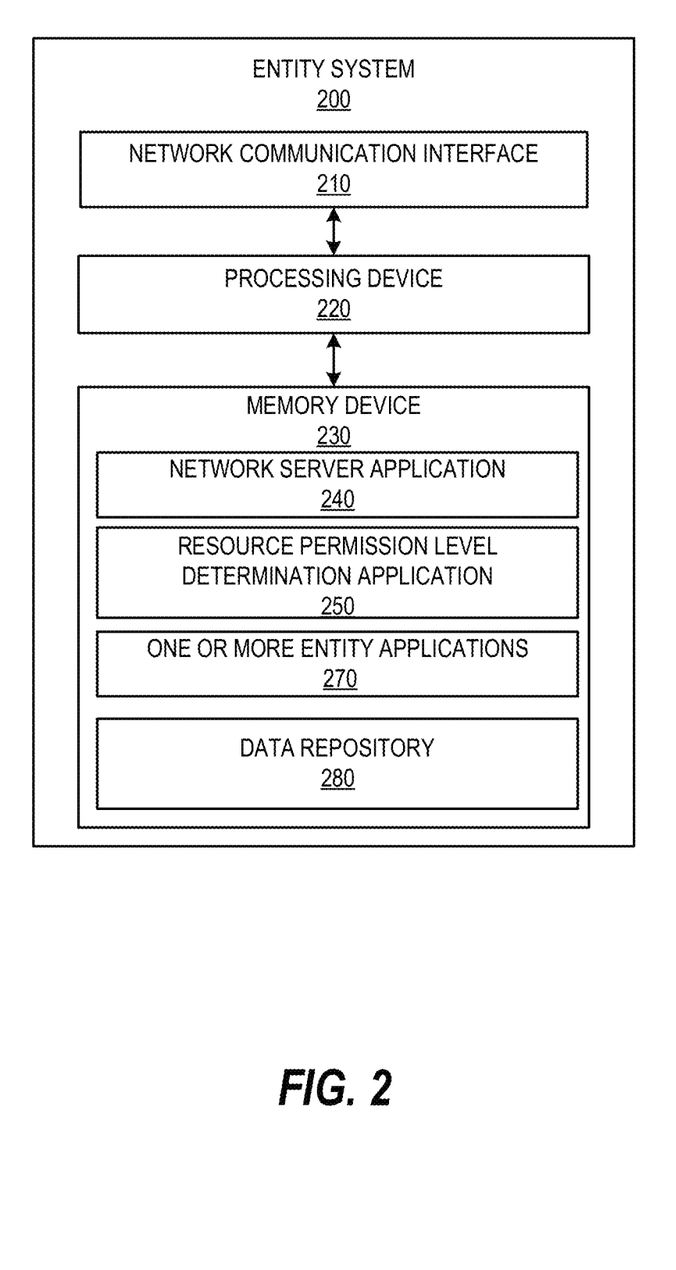
FIG. 2 provides a block diagram illustrating the entity system 200 of FIG. 1, in accordance with embodiments of the present disclosure.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a resource permission level determination application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the resource permission level determination application 250, the one or more entity application 270 to perform certain logic, data-extraction, and data-storing functions of the entity system 200 described herein, as well as communication functions of the entity system 200.

The network server application 240, the resource permission level determination application 250, and the one or more entity applications 270 are configured to store data in the data repository 280 or to use the data stored in the data repository 280 when communicating through the network communication interface 210 with the resource permission level determination device 300, and/or the computing device system 400 to perform one or more process steps described herein. In some embodiments, the entity system 200 may receive instructions from the resource permission level determination device 300 via the resource permission level determination application 250 to perform certain operations. The resource permission level determination application 250 may be provided by the resource permission level determination device 300. The one or more entity applications 270 may be any of the applications used, created, modified, facilitated, and/or managed by the entity system 200.

Figure 3:
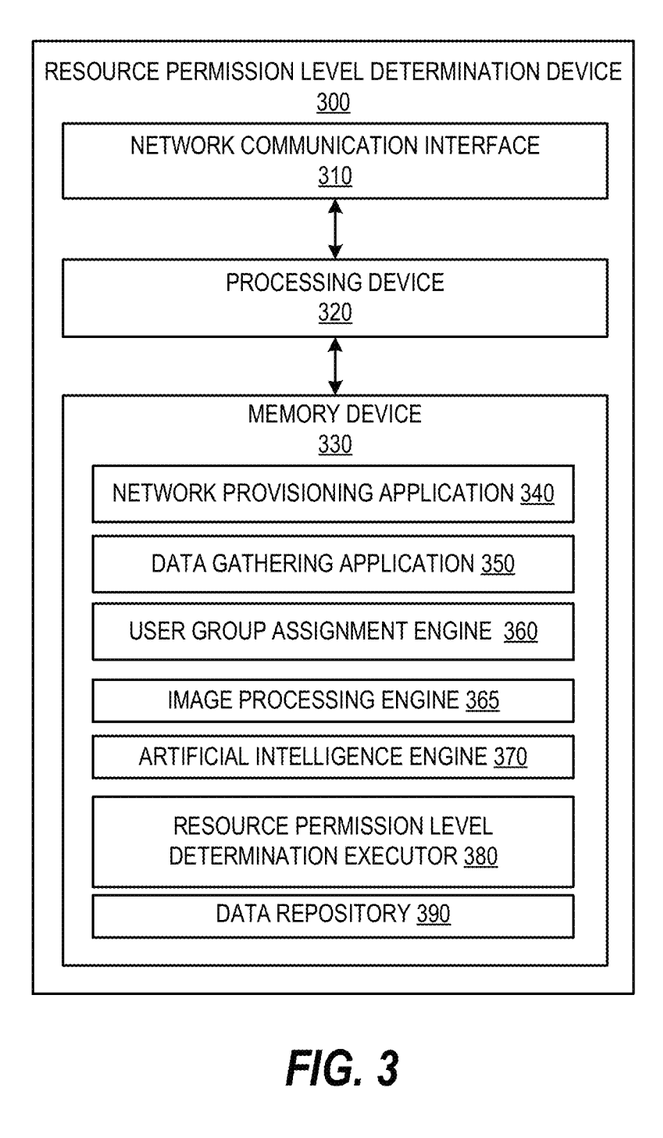
FIG. 3 provides a block diagram illustrating a resource permission level determination device 300 of FIG. 1, in accordance with embodiments of the present disclosure.

FIG. 3 provides a block diagram illustrating the resource permission level determination device 300 in greater detail, in accordance with various embodiments. As illustrated in FIG. 3, in one embodiment, the resource permission level determination device 300 includes one or more processing devices 320 operatively coupled to a network communication interface 310 and a memory device 330. In certain embodiments, the resource permission level determination device 300 is operated by an entity, such as a financial institution. In some embodiments, the resource permission level determination device 300 is owned or operated by the entity of the entity system 200. In some embodiments, the resource permission level determination device 300 may be an independent system. In alternate embodiments, the resource permission level determination device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource permission level determination device 300 described herein. For example, in one embodiment of the resource permission level determination device 300, the memory device 330 includes, but is not limited to, a network provisioning application 340, a data gathering application 350, a user group assignment engine 360, an image processing engine 365, an artificial intelligence engine 370, a resource permission level determination executor 380, and a data repository 390 comprising any data processed or accessed by one or more applications in the memory device 330. The computer-executable program code of the network provisioning application 340, the data gathering application 350, the user group assignment engine 360, the image processing engine 365, the artificial intelligence engine 370, and the resource permission level determination executor 380 may instruct the processing device 320 to perform certain logic, data-processing, and data-storing functions of the resource permission level determination device 300 described herein, as well as communication functions of the resource permission level determination device 300.

The user group assignment engine 360, the artificial intelligence engine 365, and/or the resource permission level determination executor 380 may alone, or in combination, be configured to assign a user to a user group and determine the resource permission level for at least one resource based on the user group assignment. The user group assignment engine 360, the artificial intelligence engine 365, and/or the resource permission level determination executor 380 may include a user group database generated to assist in assigning the user to a user group and a resource permission level database generated to assist in determining the resource permission level of one or more resources for a given user group. The user group database and the resource permission level database may be separate or combined (e.g., within data repository 390 or elsewhere within the memory device 330).

The network provisioning application 340, the data gathering application 350, the user group assignment engine 360, the image processing engine 365, the artificial intelligence engine 370, and the resource permission level determination executor 380 are configured to invoke or use the data in the data repository 390 when communicating through the network communication interface 310 with the entity system 200, and/or the computing device system 400. In some embodiments, the network provisioning application 340, the data gathering application 350, the user group assignment engine 360, the image processing engine 365, the artificial intelligence engine 370, and the resource permission level determination executor 380 may store the data extracted or received from the entity system 200, and the computing device system 400 in the data repository 390. In some embodiments, the network provisioning application 340, the data gathering application 350, the user group assignment engine 360, the image processing engine 365, the artificial intelligence engine 370, and the resource permission level determination executor 380 may be a part of a single application.

Figure 4:
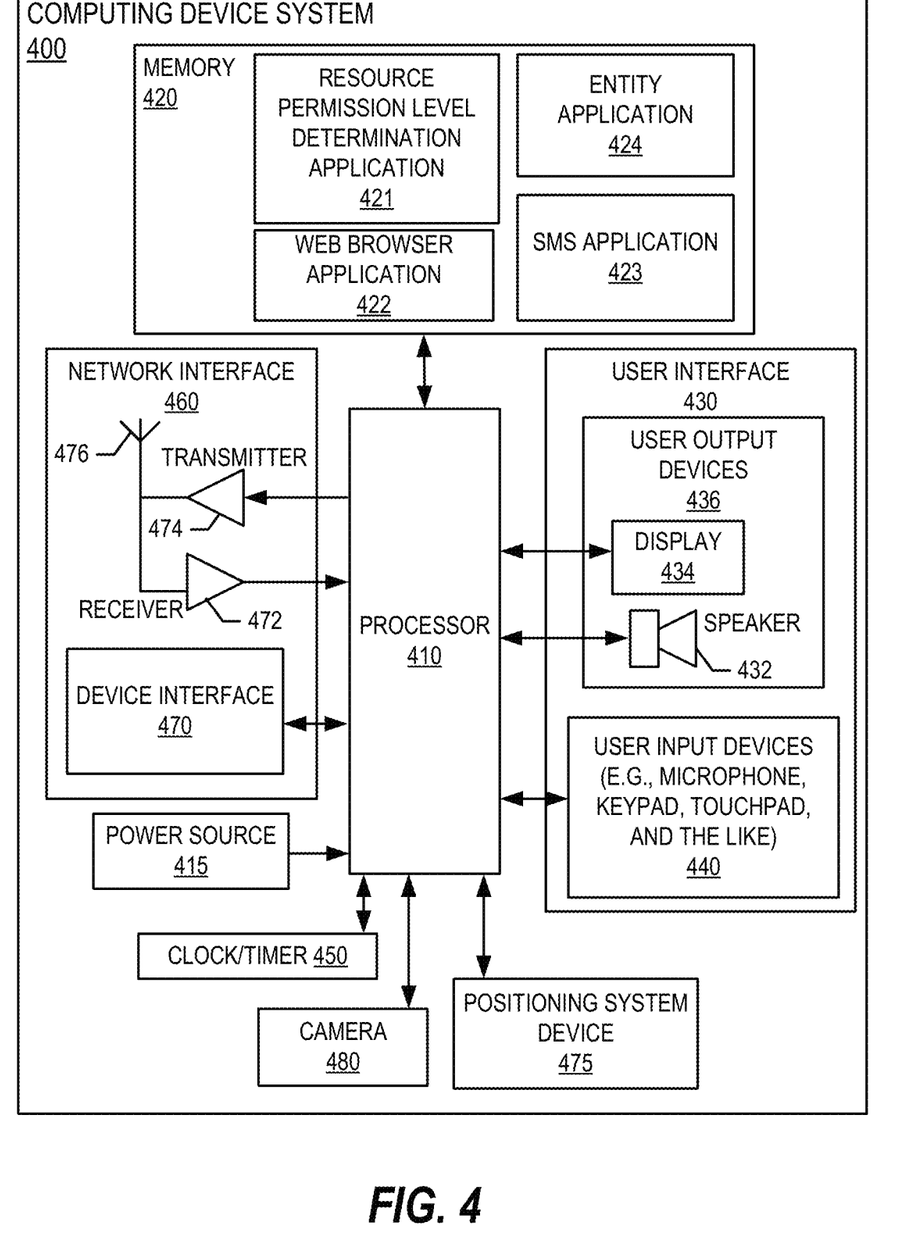
FIG. 4 provides a block diagram illustrating the computing device system 400 of FIG. 1, in accordance with embodiments of the present disclosure.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource permission level determination application 421, entity application 424. These applications also typically instructions to a graphical user interface (GUI) on the display 430 that allows the user 110 to interact with the entity system 200, the resource permission level determination device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource permission level determination application 421 provided by the resource permission level determination device 300 allows the user 110 to access the resource permission level determination device 300. In some embodiments, the entity application 424 provided by the entity system 200 and the resource permission level determination application 421 allow the user 110 to access the functionalities provided by the resource permission level determination device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
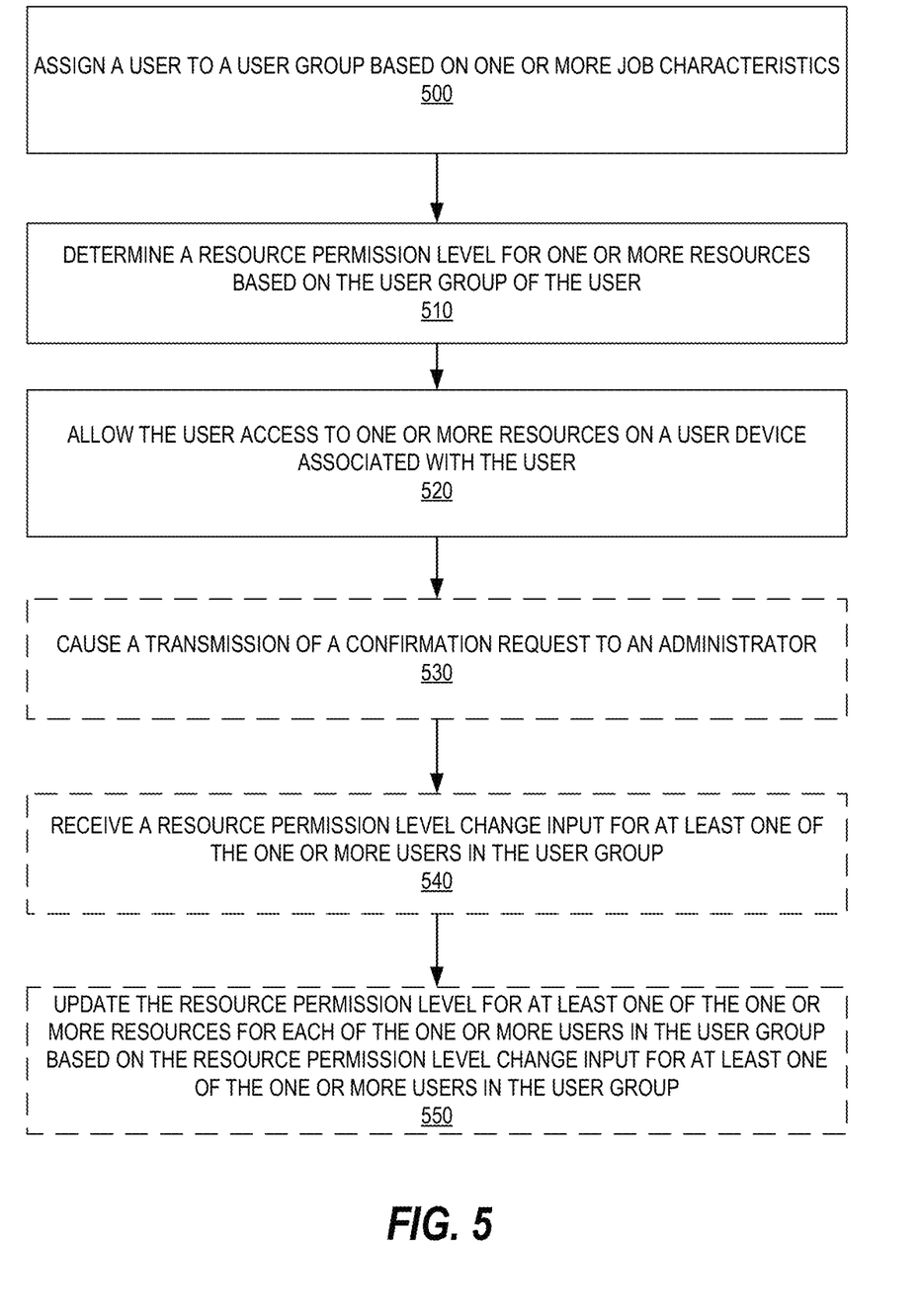
FIG. 5 provides a flowchart illustrating a method of automatically assigning resource permission levels in accordance with embodiments of the present disclosure.

Referring now to FIG. 5, a method of automatically assigning resource permission levels is provided. The method may be carried out by a system discussed herein (e.g., the entity system 200, the resource permission level determination device 300, and/or the computing device system 400). An example system may include at least one non-transitory storage device and at least one processing device coupled to the at least one non-transitory storage device. In such an embodiment, the at least one processing device is configured to carry out the method discussed herein.

Referring now to Block 500 of FIG. 5, the method may include assigning a user to a user group based on one or more job characteristics. The one or more job characteristics may include job title (or job code), one or more job responsibilities, practice group information, supervisor information, co-worker information, and/or the like. Based on the job characteristics, the user may be assigned to a user group (e.g., the given user may be placed into a user group with other similar positioned users). The user group includes one or more users associated with a common job type. A common job type may include at least one of a common job title, a common supervisor, or a common practice group.

The user group in which the user is assigned may be determined based on job characteristics. The user group assignment engine 360, the artificial intelligence engine 365, and/or the resource permission level determination executor 380 discussed in reference to FIG. 3 above may include a user group database generated to assist in determining a user group based on job characteristics associated with the user. The user group database may include known job characteristics of one or more users assigned to a given user group.

The user group database may be generated and/or updated using machine learning processes that incorporate prior user group assignments for other users and other known user group characteristics. For example, the user group database may include job characteristics of one or more users in a given user group based on past user group assignments. Additionally, the user group database may include user group keywords that indicate one or more job characteristics that may be associated with a given user group. For example, a work group user group may include one or more keywords relating to the practice group or job title of users within said group. The user group database may also be referenced by the system in order to compare one or more users of a given user group to the user being assigned (e.g., the job characteristics of a new user being assigned to a user group may be compared to the job characteristics of one or more users in a user group to determine whether the new user should be assigned to said user group).

The user group database may also include information relating to a given user, such as past user group assignments and associated users. For example, a user already assigned to a user group may be reassigned to another user group based on a change in job characteristic (e.g., a promotion) and the system may reference the user group database to determine the appropriate user group based on the changes to the job characteristics of the user. For example, a user may get promoted to a manager of the same practice group in which said user was previously working and in such an example may be assigned to a "management" user group associated with the practice group based on said user's current membership in a non-management user group.

The system may use various machine learning methods to assign users to user group(s), including both supervised and unsupervised learning. The system may be configured to audit or analyze previous user group assignments to determine whether said user group assignments were accurate. Additionally, the system may be configured to update the user group database based on any manual changes to the user group assignments (e.g., an administrator changing the user group or resource permission level of a resource for a user may indicate that the user group database may need to be updated in order to correctly assign users in the future.

A user may also be assigned to multiple user groups using the operations discussed in Block 500. In some instances, the user may have one or more primary user groups and one or more secondary user groups. For example, the user may be assigned to a primary user group relating to the given user's job title and then a secondary user group based on a committee in which the user is also a member. While the user may be automatically assigned to a given user group, the user may also be manually assigned to one or more user groups. For example, a new employee may be both assigned to a user group based on the given employee's job title, as well as manually assigned to a user group with other new employees.

Referring now to Block 510 of FIG. 5, the method may include determining a resource permission level for one or more resources based on the user group of the user. A resource may be an application or program in which a user may access via the user device 400. In various embodiments, the entity system 200 may have control over assigning resource permission levels for one or more resources. While discussed in reference to programs and applications, a resource can relate to anything that the system can control access or functionality over for one or more users (e.g., the operations discussed herein may be used to restrict websites based on user group).

The resource permission level for one or more resources may indicate whether the user has access to a given resource, and in an instance in which said user does have access to said resource, what level of access is allowed for the given user. A given resource may have different resource permission levels that allow for different features. For example, a resource may be a word processing program and the resource permission level may indicate the number of features accessible by the user.

The system may determine the resource permission level of a given resource based on a user group. For example, the system may store one or more resources related to a given user group and the resource permission level for said resource. In some embodiments, the system may have a database that indicates the resources accessible by a given user group. Each of the users in a user group may receive the same resource permission level for at least one of the one or more resources. For example, if the user group relates to a given job title, all users with the given job title may receive the same resource permission level for at least one resource.

As discussed above, the system may include a user group database that is used to assign a user to a user group. Additionally, the system may also have, either in conjunction with or separate from the user group database, a resource permission level database that indicates the resource permission levels for one or more resources based on a given user group. The resource permission level database may be generated and/or updated using machine learning processes that incorporates resource permission levels for given resources of users within a given user group. For example, resource permission level database may store the resource permission level for each user for a given resource, and/or the resource permission level database may store all users that have a given resource permission level for a given resource. In various embodiments, the resource permission level database may, via machine learning, determine one or more resource permission levels for one or more resources for a given user group based on the resource permission levels.

The system may use various machine learning methods to update the resource permission level for one or more resources for a given user group, including both supervised and unsupervised learning. The system may be configured to update the resource permission level database based on any changes to a user's resource permission level of a resource within the given user group.

In an instance in which the user is assigned to multiple user groups, the user may receive at least one resource permission level for at least one resource based on each of the plurality of user groups assigned. In an instance in which there is no overlapping resource permissions for multiple user groups (e.g., the user is not in different user groups with varying resource permission level for the same resource), then the resource permission level for the given resource is based on the user group that has a resource permission level associated with the user group. For example, in an instance in which a user is in User Group A and User Group B, and a given resource has a given resource permission level for members of User Group A, but none for User Group B, then the user would be assigned the resource permission level associated with User Group A for the given resource.

In an example in which a user is a member of multiple user groups that have contradictory resource permission levels for a given resource, then the system may be configured to determine a resource permission level based on at least one of said user groups. For example, the system may assign the highest resource permission level between the multiple groups (e.g., in an instance in which User Group A is allowed administrative access to a given resource and User Group B is merely given non-administrative access, then the user, which is a member of both User Group A and User Group B may receive administrative access). In some embodiments, the user may have a hierarchy of user groups (e.g., primary user groups and secondary user groups), and the given resource permission level for the given resource may be based on said hierarchy.

Referring now to Block 520 of FIG. 5, the method may include allowing the user access to one or more resources on a user device associated with the user. Allowing the user access may include allowing the user to access a resource (e.g. providing website credentials), allowing the user to download and/or user a given resource (or automatically downloading a resource to a user device 400 associated with the given user), and/or the like. The user access is based on the resource permission level for the given resource. As discussed above, the user may have different resource permission levels for different resources (e.g., based on the user group). Additionally, the user may have different resource permission levels than other users on the system (e.g., users in different user groups). The resource permission levels for given resource(s) may change periodically. For example, a given user group may be updated to allow access to a new resource.

Referring now to optional Block 530 of FIG. 5, the method may include causing a transmission of a confirmation request to an administrator. The confirmation request to the administrator may include an option to approves or declines at least one of the user group or the one or more resource permission levels assigned to the user. The administrator may be a human resource manager, a supervisor, IT manager, or any other user that may determine a given user's permission. The administrator confirmation may be before or after the user is given access to the given resources.

The confirmation request may include the employee information, user group, and/or resource permission levels for given resources. For example, a supervisor that gets a new employee may receive a confirmation request for the new user (e.g., the new employee) to confirm that the user is in fact in the correct practice group, that the user is allowed to access the appropriate resources, and/or that other information relating to the user is correct.

While the operations discussed herein are often discussed in reference to a new employee, the operations may be used for any user on a system network. Additionally, the operations may be performed periodically for a given user (e.g., not just when the user is new) to confirm that the user is receiving the correct resource permission levels for the resource(s). For example, a user group may receive new resource access or the user may change roles within an organization that results in different resource access needs.

Referring now to optional Block 540 of FIG. 5, the method may include receiving a resource permission level change input for at least one of the one or more users in the user group. In some instances, during operation, a user may need different resource permission levels for a given resource than originally assigned. For example, a user may be assigned a specific role within a user group or practice group that requires access to a resource that would not be needed for other users in the same user group. In such an instance, the system may be configured to receive a resource permission level change input. Said input may be received from the user themselves (e.g., the user may request access to a given resource), a supervisor (e.g., indicating that the given user may access the given resource), IT workers (e.g., in response to a request and confirmation from the user or supervisor), and/or the like.

In some embodiments, the resource permission level change input may relate to all users within a given user group. For example, a new resource (e.g., a new program) may be introduced to the system and the resource permission level change input may indicate the resource permission level appropriate for the given user group. Additionally, over time the needs of a user group in terms of resource access may change, resulting in the need to change the resource permission level for one or more resources. The resource permission level change input may be the result of a periodic review of resource usage (e.g., either automatically or manually, the usage of a given resource by users of a given user group may be analyzed to determine whether the current resource permission level is appropriate).

Referring now to optional Block 550 of FIG. 5, the method may include updating the resource permission level for at least one of the one or more resources for each of the one or more users in the user group based on the resource permission level change input for at least one of the one or more users in the user group. As discussed above in reference to Block 540 of FIG. 5, the resource permission level change input may indicate a change to the resource permission level of at least one resource for at least one user. Additionally, the change may also be carried out across all users of one or more user groups in which the user is assigned. In some instances, a change request may be submitted with or in response to the resource permission level change input that indicates whether the resource permission level change should be carried out on all users in the user group.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for automatically assigning resource permission levels, the system comprising:
  at least one non-transitory storage device; and
  at least one processing device coupled to the at least one non-transitory storage device, wherein the at least one processing device is configured to:
    assign, using a machine learning model, a user to a plurality of user groups based on one or more job characteristics associated with the user and based on a user group database comprising historical one or more job characteristics of one or more users and a plurality of potential user groups in an entity, wherein the machine learning model incorporates the user group database and historical one or more job characteristics to assign the user to the plurality of user groups, and wherein each user group comprises one or more users associated with a common job type out of a plurality of potential job types in the entity;
    determine, by the machine learning model, a resource permission level for one or more resources of each user of the assigned user groups, wherein the machine learning model incorporates a resource permission level database that stores all the resource permission levels for a given resource for each user, and wherein the machine learning model uses the user group database and the resource permission level database to determine the resource permission levels for one or more resources for each user of the user groups;
    determine a level of access for the resource permission level for the user, wherein the level of access comprises at least one feature accessible to the user, and wherein the level of access is based on a highest level of access for the resource between the assigned user groups;
    cause a transmission of a confirmation request to an administrator, wherein the administrator approves or declines at least one of the user group or the one or more resource permission levels assigned to the user; and
    when the administrator approves, allow the user access to the one or more resources on a user device associated with the user based on the assigned user group and the level of access for the one or more resources.

2. The system of claim 1, wherein the common job type comprises at least one of a common job title, a common supervisor, or a common practice group.

3. The system of claim 1, wherein the user is assigned to a plurality of user groups, wherein the user receives at least one resource permission level for at least one resource based on each of the plurality of groups.

4. The system of claim 1, wherein the at least one processing device is further configured to update the resource permission level of at least one of the one or more resources based on a change to at least one resource permission level of at least one of the users assigned to the user group.

5. The system of claim 1, wherein the at least one processing device is further configured to receive a resource permission level change input for at least one of the one or more users in the user group, wherein the resource permission level is updated for the at least one of the users in the user group related to the resource permission level change input.

6. The system of claim 5, wherein the at least one processing device is further configured to update the resource permission level for at least one of the one or more resources for each of the one or more users in the user group based on the resource permission level change input for at least one of the one or more users in the user group.

7. The system of claim 1, wherein the determination of the resource permission level for the user is continuously determined based on a periodic review of resource usage.

8. The system of claim 1, wherein the access level of the resource permission level is based on a hierarchy of user groups for the user, and the resource permission level for each resource is based on said hierarchy.

9. A computer program product for automatically assigning resource permission levels, the computer program product comprising at least one non-transitory computer-readable medium having computer-readable program code portions embodied therein, the computer-readable program code portions comprising:
  an executable portion configured to assign, using a machine learning model, a user to a plurality of user groups based on one or more job characteristics associated with the user and based on a user group database comprising historical one or more job characteristics of one or more users and a plurality of potential user groups in an entity, wherein the machine learning model incorporates the user group database and historical one or more job characteristics to assign the user to the plurality of user groups, and wherein each user group comprises one or more users associated with a common job type out of a plurality of potential job types in the entity;
  an executable portion configured to determine, by the machine learning model, a resource permission level for one or more resources of each user of the assigned user group, wherein the machine learning model incorporates a resource permission level database that stores all the resource permission levels for a given resource for each user, and wherein the machine learning model uses the user group database and the resource permission level database to determine the resource permission level for one or more resources for each user of the user group;
  an executable portion configured to determine a level of access for the resource permission level for the user, wherein the level of access comprises at least one feature accessible to the user, and wherein the level of access is based on a highest level of access for the resource between the assigned user groups;
  an executable portion configured to cause a transmission of a confirmation request to an administrator, wherein the administrator approves or declines at least one of the user group or the one or more resource permission levels assigned to the user; and when the administrator approves, an executable portion configured to allow the user access to the one or more resources on a user device associated with the user based on the assigned user group and the level of access for the one or more resources.

10. The computer program product of claim 9, wherein the common job type comprises at least one of a common job title, a common supervisor, or a common practice group.

11. The computer program product of claim 9, wherein the user is assigned to a plurality of user groups, wherein the user receives at least one resource permission level for at least one resource based on each of the plurality of groups.

12. The computer program product of claim 9, wherein the computer-readable program code portions further comprise an executable portion configured to update the resource permission level of at least one of the one or more resources based on a change to at least one resource permission level of at least one of the users assigned to the user group.

13. The computer program product of claim 9, wherein the computer-readable program code portions further comprise an executable portion configured to receive a resource permission level change input for at least one of the one or more users in the user group, wherein the resource permission level is updated for the at least one of the users in the user group related to the resource permission level change input.

14. The computer program product of claim 13, wherein the computer-readable program code portions further comprise an executable portion configured to update the resource permission level for at least one of the one or more resources for each of the one or more users in the user group based on the resource permission level change input for at least one of the one or more users in the user group.

15. A computer-implemented method for automatically assigning resource permission levels, the method comprising:

assigning, using a machine learning model, a user to a plurality of user groups based on one or more job characteristics associated with the user and based on a user group database comprising historical one or more job characteristics of one or more users and a plurality of potential user groups in an entity, wherein the machine learning model incorporates the user group database and historical one or more job characteristics to assign the user to the plurality of user groups, and wherein each user group comprises one or more users associated with a common job type out of a plurality of potential job types in the entity;

determining, by the machine learning model, a resource permission level for one or more resources of each user of the assigned user group, wherein the machine learning model incorporates a resource permission level database that stores all the resource permission levels for a given resource for each user, and wherein the machine learning model uses the user group database and the resource permission level database to determine the resource permission level for one or more resources for each user of the user group;

determining a level of access for the resource permission level for the user, wherein the level of access comprises at least one feature accessible to the user, and wherein the level of access is based on a highest level of access for the resource between the assigned user groups;

causing a transmission of a confirmation request to an administrator, wherein the administrator approves or declines at least one of the user group or the one or more resource permission levels assigned to the user; and when the administrator approves, allowing the user access to the one or more resources on a user device associated with the user based on the assigned user group and the level of access for the one or more resources.

16. The method of claim 15, wherein the common job type comprises at least one of a common job title, a common supervisor, or a common practice group.

17. The method of claim 15, wherein the user is assigned to a plurality of user groups, wherein the user receives at least one resource permission level for at least one resource based on each of the plurality of groups.

18. The method of claim 15, further comprising receiving a resource permission level change input for at least one of the one or more users in the user group, wherein the resource permission level is updated for the at least one of the users in the user group related to the resource permission level change input.

* * * * *